Aug. 20, 1963
G. E. VALENTINE ETAL
3,101,004
UNIDIRECTIONAL DRIVE MECHANISM
Original Filed Sept. 1, 1955
2 Sheets-Sheet 2
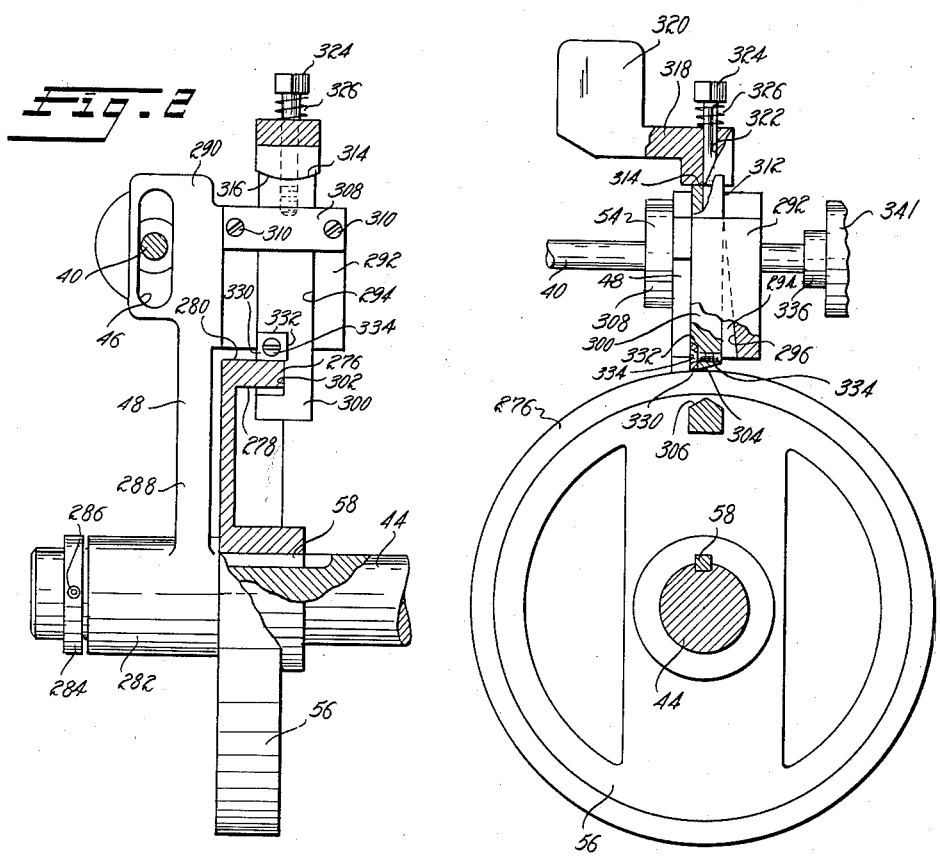
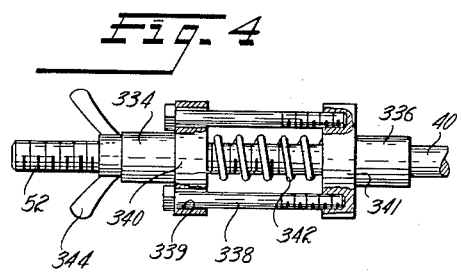
INVENTORS
GEORGE G. VALENTINE
JOSEPH. H. EUBANKS
BY
ATTORNEYS United States Patent Office 3,101,004
Patented Aug. 20, 1963

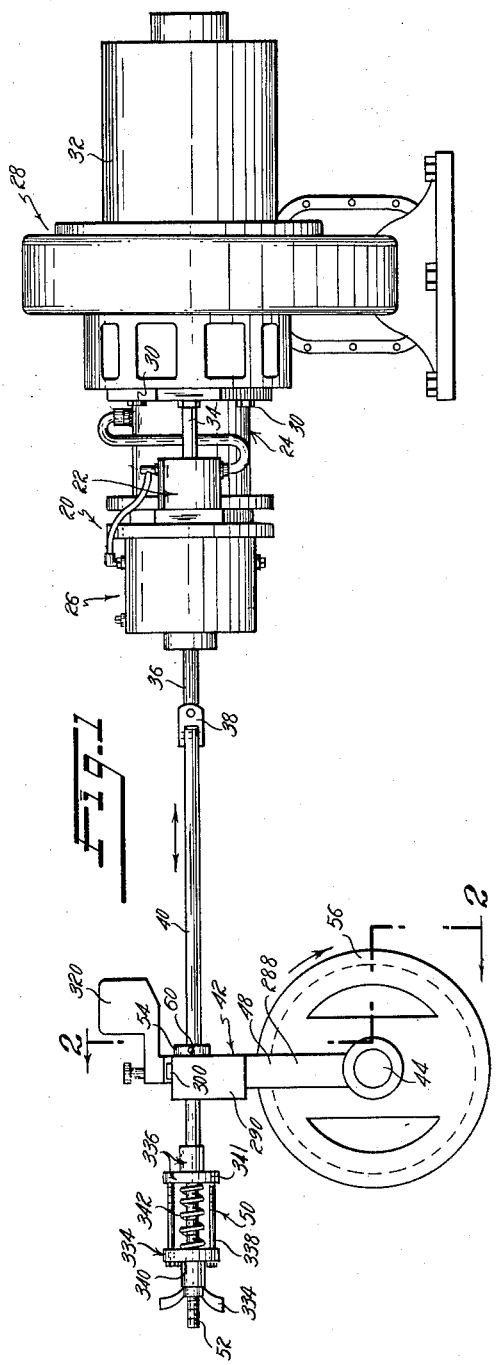

3,101,004
UNIDIRECTIONAL DRIVE MECHANISM
George E. Valentine and Joseph H. Eubanks, Schuylkill Haven, Pa., assignors to Thermo Dynamics Corporation, Schuylkill Haven, Pa., a corporation of Pennsylvania
Original application Sept. 1, 1955, Ser. No. 532,078, now Patent No. 2,932,166, dated Apr. 12, 1960. Divided and this application Aug. 19, 1959, Ser. No. 834,822
6 Claims. (Cl. 74—148)

This invention relates to a unidirectional drive mechanism particularly related to a power actuated intermittent stoker drive of the type in which reciprocatory motion is changed to unidirectional rotary motion. The invention herein has been divided from our copending application Serial No. 532,078, filed September 1, 1955 for Stoker Drive Mechanism, now Patent No. 2,932,166.

Intermittent unidirectional clutch driven stoker feed wheels are known, one such mechanism being disclosed in United States Patent 2,142,815 to W.W. Getz which illustrates a belt driven wheel having an eccentric roller intermittently actuating a gripping dog one-way clutch to provide intermittent unidirectional increments of stoker worm shaft rotation. Other previously known types of stoker drives utilize speed reduction gearing between an electric motor and the stoker feed mechanism, to operate the feed mechanism either intermittently or at a very slow continuous rate.

Operation of such previously known stoker feed devices is generally satisfactory but they have several inherent objectionable features. Normal operation of such devices is noisy and all tend to become noisier after a continued period of operation. Furthermore, mechanical devices requiring a plurality of relatively moving parts such as belts, pulleys, eccentrics and gears are subject to unreliable performance or breakdown even when continuously serviced.

The present invention is quiet in operation even after continued use and, as described and claimed in the aforenoted parent application, was developed for use with a hydraulic speed reducing mechanism, operating continuously in its own fluid, which is less susceptible to breakdowns, even when service is neglected, and is therefore more dependable over longer periods of operation.

The unitary hydraulic speed reducing mechanism may for convenience, be driven by the electric motor used to drive the furnace blower fan assembly and converts high speed rotary movement of the motor shaft to a low speed reciprocatory movement. The unitary hydraulic device incorporates an automatic reversing control valve to automatically accomplish a periodic reversal of a servomotor operating a reciprocating shaft. The reciprocating shaft connects, through an improved unidirectional dog type clutch, to a drive wheel fixed to a rotatable shaft element of a stoker feed mechanism. The hydraulic unit includes a positive displacement pump that is easily adjusted to vary the output capacity, and the inter-connection between the reciprocatory shaft and the unidirectional wedge clutch is further adjustable to vary the amplitude of each increment of intermittent stoker rotation. To provide a longer life for the gripping clutch dog and decrease replacement costs for clutch parts, a four way gripping jaw insert has been devised.

Accordingly a primary object of this invention resides in the provision of a novelly improved dependable unidirectional drive mechanism.

Another object resides in a novel unidirectional clutch mechanism with a jaw insert having a plurality of gripping edges adjustably fixed on the clutch dog.

Still another object resides in a novel unidirectional gripping dog type clutch having adjustment means for controlling operative relationship of the clutch gripping dog relative to the driven part of the clutch.

Further objects and advantages of the invention will be apparent from the foregoing description and the appended claims taken in conjunction with the accompanying drawings, wherein:

FIGURE 1 is a side elevation view illustrating an example of the hydraulic speed reducer unit and stoker feed mechanism as adapted for use in a worm type furnace stoker;

FIGURE 2 is an enlarged vertical section view taken on line 2—2 of FIGURE 1 illustrating details of the unidirectional feed mechanism;

FIGURE 3 is a left side elevation view of the feed mechanism shown in FIGURE 2 with parts broken away to show details of the unidirectional drive structure; and FIGURE 4 is an enlarged sectional view of the adjustable abutment cage fastened to the end of the reciprocatory feed shaft.

*General*

The application of the speed reducer and feed mechanism to a furnace stoker is illustrated in FIGURE 1. The speed reducing unit 20 with a pump 22, a reciprocating servo-motor 24 and control structure 26, as illustrated, is mounted on a furnace blower unit 28 by machine screws 30. Blower unit 28, per se, forms no part of this invention and merely illustrates one convenient manner of deriving power for the speed reducing unit from equipment available in the majority of furnace installations. The electric motor 32 of the blower unit 28 has its drive shaft universally or flexibly coupled (not shown) to the pump impeller shaft 34. The motor may be a conventional 1750 r.p.m. motor ordinarily having an H.P. rating of ⅙, ¼ or ⅓.

Rotary movement of pump 22 is converted through the speed reducer 20 to reciprocatory movement of the piston rod 36 which extends through the control structure 26 and has its projecting end fastened to a universal coupling 38. The speed reduction from rotation of impeller shaft 34 to reciprocation of piston rod 36 is desirably a ratio of 1500:1. By increasing or decreasing the output capacity of pump 22, in a manner described in the parent application Serial No. 532,078, now Patent No. 2,932,166, the ratio of speed reduction may be varied.

Connected to the other side of universal fitting 38, a feed shaft 40 extends to and cooperatively engages a unidirectional clutching mechanism 42 carried by the stoker sprocket shaft 44. Feed shaft 40 passes through a slotted opening 46 (FIGURE 2) in the upper end of clutch fitting 48 and carries an adjustable resilient abutment cage 50 on its threaded end 52. The unidirectional clutch mechanism 42 will be more fully described hereinafter, but for purposes of general explanation reciprocation of feed shaft 40 (FIGURE 1) to the right will cause the abutment cage 50 to engage clutch fitting 48 and move it a short increment in a clockwise direction. Unidirectional clutch action will grip and rotate a wheel 56, drivingly connected to the sprocket shaft 44 by a spline 58, the same increment of rotation imparted to the clutch fitting 48. Reverse reciprocation of piston rod 36 moves the feed shaft 40 and abutment cage 50 to the left, and collar 54, fastened to shaft 40 by set screw 60, will abut the clutch fitting 48 and force it counterclockwise. The collar 54 is so positioned on shaft 40 that it does not force the clutch fitting over center when the feed shaft 40 is at the left hand end of its stroke. Because of the unidirectional nature of clutch mechanism 42 the counterclockwise movement of fitting 48 by collar 54 will not cause a counterclockwise rotation of wheel 56 and stoker sprocket shaft 44.

Stoker Feed Mechanism

Disclosed in combination with the hydraulic speed reducer in FIGURE 1 and in more specific detail in the enlarged FIGURES 2 and 3, a specific stoker feed structure comprising a feed sprocket (not shown) is fixed to rotate with sprocket shaft 44. The speed reducer 20, its reciprocating piston rod 36 and connected feed shaft 40 are so disposed that the feed shaft 40 will be substantially transverse to the axis of sprocket shaft 44. As previously described, a sprocket shaft feed wheel 56 is fixed to the shaft 44 by spline 58. The rim 276 of wheel 56 is formed as an axially directed annular flange with cylindrical inner and outer surfaces 278 and 280. Sprocket shaft 44 projects beyond the wheel 56 and forms a journal for the hub member 282 of the previously mentioned clutch fitting 48 which is axially retained on the end of shaft 44 by means of a collar 284 and set screw 286.

Fittings 48 includes an arm 288 vertically disposed at the side face of wheel 56. At the top of arm 288, a relatively heavy integral side boss 290 includes the previously mentioned slot 46 which is directed transverse to the journal axis of hub 282. On the opposite side of the top of vertical arm 288 a second boss 292 projects over the rim 278 of wheel 56. The side face of boss 292 which is disposed toward the hydraulic speed reducer 20 has a vertical channel 294 formed from top to bottom with the back wall 296 of the channel inclined down and away from a plane passing through the vertical arm 288 and including the axis of the hub 282.

A unidirectional clutch dog 300 consisting of a bar, with a horizontal recess 302 near its lower end forming upper and lower gripping jaws 304 and 306 respectively, is placed in channel 294 with the recess 302 disposed over the wheel flange 276 so the upper jaw 304 rests on the outer cylindrical surface 280 of flange 276. Dog 300 fits in the vertical channel 294 with a free close fit and is prevented from being displaced out of the channel by the plate 308 fastened to the front face of boss 292 by the screws 310. In FIGURE 3, movement of the clutch fitting 48 toward the left exerts a force through the upper edge 312 of channel 294 abutting the upper end of clutch dog 300 and, as the upper jaw 304 of dog 300 rests on the outer cylindrical surface of wheel flange 276 with a slight frictional force, the dog 300 will cant forward as permitted by the inclined rear face 296 of channel 294 and a gripping action occurs between the jaws 304, 306 on wheel flange 276. Movement of the clutch fitting 48 toward the right (FIGURE 3) will cause the dog 300 to straighten and release its grip on flange 276 while it is being carried to the right or clockwise by the fitting 48. Note, when moving toward the right the dog will pivot on the wheel flange until it becomes aligned radially with the pivot axis of fitting 48 and will be maintained in such position by coaction between the top edge 312 of channel 294 and the rear face of plate 308. In this position, sufficient clearance exists between the dog jaws 304 and 306 to permit free relative movement between the dog 300 and wheel 56. Thus, an incremental rotation of fitting 48 to the left (FIGURE 3) imparts an equivalent incremental rotation to wheel 56 and sprocket shaft 44, and incremental movement of fitting 48 back to its rest position will release the dog 300 and move it back a specific increment about the circumference of wheel 56 to a new gripping position, and such periodic oscillation of the fitting 48 results in unidirectional movement of the wheel 56.

The upper end 314 of dog 300 has a concave curve forming half of a clutch dog control detent. The other half of the detent is the convex end 316 on the horizontal arm 318 of a weighted member 320. A vertically disposed hole 322 is provided through the end 316 of weighted member 320 and enables the weighted member to be pivotally carried on the shank of a bolt 324 threaded into the upper end of dog 300. A spring 326, encircles the shank of bolt 324 and is compressed between the upper side of weight end 316 and the head of the bolt to spring bias the convex end 316 into a snug abutment against the concave end 314 of dog 300. This structure provides an adjustable control for the unidirectional clutch. When the weighted member 320 is positioned as shown in FIGURE 3, the tendency of dog 300 is to cant counterclockwise relative to the axis of shaft 44 placing the gripping jaws 304 and 306 into gripping engagement with the flange of wheel 56. If it is desirable that no feed action be imparted to the wheel 56 by oscillation of the clutch fitting 48, weighted member 320 can be pivoted 180° from the position shown in FIGURE 2. In such a position the tendency of dog 300 is to cant clockwise relative to the axis of shaft 44 and no gripping action between the two dog jaws 304 and 306 results because the slight friction of the upper dog jaw on the wheel flange will not counteract the action of weight 320 which opposes canting of the dog. Oscillatory movement of the fitting 48 will merely cause the upper jaw of dog 300 to slide along the flange 276 and no rotation is imparted to the wheel 56.

To permit continuous operation without replacing clutch dog 300 because of worn jaws, an upper jaw insert 330 of hardened steel with four gripping edges 332 is fastened to the front face of dog 300 by a screw 334. With such an insert, it only becomes necessary to loosen screw 334 and rotate the insert 330 90° to place a new gripping jaw 332 adjacent the outer cylindrical surface 280 of flange 276. Four gripping edges are shown in the preferred embodiment but any number within reason can be provided on the insert.

With reference now to FIGURES 1 and 4, reciprocation of the feed shaft 40 to the right will move the abutment cage 50 into engagement with the left hand side of the clutch fitting boss 290, forcing the fitting 48 to rotate clockwise about the axis of shaft 44 under the bias action of spring 342. As the stroke of shaft 40 is constant, a variation of the incremental rotation of fitting 48 is enabled through the adjustability of abutment cage 50. The cage 50 comprises two flanged knobs 334 and 336, the left hand knob 334 being in threaded engagement with threaded end 52 of feed shaft 40 while the right hand knob 336 has a free sliding fit on the shaft 40. A series of bolts 338 pass through holes 339 provided in the flange 340 of knob 334 and are screw threaded into the flange 341 of knob 336, thus permitting axial movement of knob 336 toward knob 334 and limiting axial movement of knob 336 away from knob 334. A compression spring 342 is disposed about the feed rod 40 between the two knobs 334 and 336 maintaining them in spaced apart relationship as determined by the bolts 338. Spring 342, together with the two knobs 334 and 336, provides a resilient adjustable abutment on the end of shaft 40 enabling variation in the point of engagement of the abutment cage 50 and fitting 48 during the stroke of feed shaft 40, to vary the magnitude of the incremental rotation of fitting 48. Adjustment of threaded knob 334 may be locked by a wing nut 344 threaded on the end of shaft 40 and abutting the threaded knob 334.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Mechanism for converting reciprocatory movement to unidirectional rotary movement comprising: a support; a wheel with an annular axially projecting flange journalled on said support; a clutch member journalled on said support coaxial with said wheel; a clutch dog having a lateral recess at one end with upper and lower gripping jaws fitted over the wheel flange and carried by said clutch member; means on said clutch member adapted to coact with said dog when said clutch member is moved in one direction to tilt said dog so the dog jaws grip said wheel flange and to coact with said dog when said clutch member is moved in the other direction to maintain said dog in a position wherein said jaws cannot grip the wheel flange; adjustable means carried by said dog movable to a position whereby said dog will not tilt and grip said flange when moved in said one direction; and means operatively connected to oscillate said clutch member.

2. A mechanism as defined in claim 1 wherein one of said gripping jaws is a removable insert having a plurality of gripping edges so arranged on said insert that any one of said edges may act as a jaw edge depending upon the manner of attaching the insert to the dog.

3. Mechanism for converting reciprocatory movement to unidirectional rotary movement comprising: a support; a wheel with an annular axially projecting flange journalled on said support; a clutch member journalled for oscillating movement on said support coaxial with said wheel and having a through slot formed transverse of its axis; a clutch dog having a lateral recess at one end with upper and lower gripping jaws fitted over the wheel flange and carried by said clutch member; means on said clutch member adapted to coact with said dog when said clutch member is moved in one direction to tilt said dog so the dog jaws grip said wheel flange and to coact with said dog when said clutch member is moved in the other direction to maintain said dog in a position wherein said jaws cannot grip the wheel flange; adjustable means carried by said dog movable to a position whereby said dog will not tilt and grip said flange when moved in said one direction; and means operatively connected to oscillate said clutch member comprising a reciprocable shaft passing through said clutch member slot, an adjustable resilient abutment means fixed to said shaft and adapted to engage and move said clutch member in said one direction under resilient abutment biasing force upon reciprocation of said shaft in one direction, and a second abutment means on said shaft adapted to engage and move said clutch member in said other direction upon reciprocation of said shaft in its other direction.

4. Mechanism for converting reciprocatory movement to unidirectional rotary movement comprising: a support; a wheel with an annular axially projecting flange journalled on said support; a clutch member journalled on said support coaxial with said wheel; a bar-shaped clutch dog positioned in a substantially radial sense relative to the axis of said wheel and having a lateral recess at its radially innermost end comprising outer and inner gripping jaws fitted over the wheel flange; and means on said clutch member disposed to overhang said wheel flange and having front and rear opposed faces closely embracing the radially outermost end of said bar-shaped clutch dog at a position radially outward of said wheel flange, said rear face engaging and providing a coaction with said dog when said clutch member is moved in one direction to tilt said dog slightly away from a true radial disposition so the dog jaws grip said wheel flange and said front and rear faces engaging and providing a coaction with said dog when said clutch member is moved in the other direction to shift and to maintain said dog in a position which is closer to a true radial position relative to the wheel axis than said tilted position wherein said jaws cannot grip the wheel flange.

5. The mechanism defined in claim 4 wherein said clutch dog has flat parallel front and rear faces, said front face of said clutch member is planar, parallel to and offset forwardly from a plane through and containing the axis of said wheel, and said rear face of said clutch member is parallel to the axis of said wheel and slants away from the clutch member front face as it approaches the wheel flange.

6. Mechanism for converting reciprocatory movement to unidirectional rotary movement comprising: a support; a wheel with an annular axially projecting flange journalled on said support; a clutch member journalled on said support coaxial with said wheel; a bar-shaped substantially vertically disposed clutch dog having a lateral recess at its lower end with upper and lower gripping jaws fitted over the wheel flange and carried by said clutch member; means on said clutch member embracing the upper portion of said dog adapted to coact with said dog when said clutch member is moved in one direction to tilt said dog so the dog jaws grip said wheel flange and to coact with said dog when said clutch member is moved in the other direction to maintain said dog in a position wherein said jaws cannot grip the wheel flange; adjustable means comprising a shiftable counterweight carried by the upper portion of said dog movable to a position to maintain said dog in structural coaction with said clutch member so that said jaws will slide on the wheel flange without gripping during movement of said clutch member in both directions.

References Cited in the file of this patent

UNITED STATES PATENTS

| | | |
|---|---|---|
| 240,536 | Peartree | Apr. 26, 1881 |
| 573,398 | Dobrick | Dec. 15, 1896 |
| 1,170,085 | Maurseth | Feb. 1, 1916 |
| 2,202,558 | Maurseth et al. | Oct. 24, 1916 |
| 2,128,370 | Lloyd | Aug. 30, 1938 |
| 2,633,214 | Cipriano | Mar. 31, 1953 |
| 2,805,581 | Daly | Sept. 10, 1957 |

FOREIGN PATENTS

| | | |
|---|---|---|
| 129,387 | Germany | July 25, 1932 |